(12) United States Patent
Taniguchi et al.

(10) Patent No.: US 9,546,725 B2
(45) Date of Patent: Jan. 17, 2017

(54) PRESS-FIT STRUCTURE AND PRESS-FIT METHOD

(75) Inventors: Makoto Taniguchi, Susono (JP); Hiroyuki Shioiri, Numazu (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 160 days.

(21) Appl. No.: 13/995,010

(22) PCT Filed: Jun. 29, 2011

(86) PCT No.: PCT/JP2011/064956
§ 371 (c)(1),
(2), (4) Date: Jun. 17, 2013

(87) PCT Pub. No.: WO2013/001627
PCT Pub. Date: Jan. 3, 2013

(65) Prior Publication Data
US 2013/0269462 A1    Oct. 17, 2013

(51) Int. Cl.
*F16H 55/17* (2006.01)
*F16H 48/38* (2012.01)
*B23P 11/00* (2006.01)
*B21K 25/00* (2006.01)
*F16H 48/40* (2012.01)

(52) U.S. Cl.
CPC .............. *F16H 55/17* (2013.01); *B21K 25/00* (2013.01); *B23P 11/00* (2013.01); *F16H 48/38* (2013.01);
(Continued)

(58) Field of Classification Search
CPC .................. F16H 2048/385; F16H 2048/382; F16H 55/17; F16H 48/38; F16H 57/02;F16H 48/40; F16H 57/023; F16H 55/18; F16H 57/025; Y10T 74/2186; Y10T 74/19921; Y10T 74/2188
(Continued)

(56) References Cited

U.S. PATENT DOCUMENTS

| | | | | |
|---|---|---|---|---|
| 4,343,563 A * | 8/1982 | Bernhagen | ..... | 403/282 |
| 5,549,336 A | 8/1996 | Hori et al. | | |
| 8,015,899 B2 * | 9/2011 | Gianone et al. | ..... | 74/606 R |
| 8,480,531 B2 * | 7/2013 | Pan et al. | ..... | 475/230 |

FOREIGN PATENT DOCUMENTS

| | | |
|---|---|---|
| CN | 1082158 A | 2/1994 |
| EP | 647789 A1 | 4/1995 |

(Continued)

*Primary Examiner* — Thomas Diaz
(74) *Attorney, Agent, or Firm* — Andrews Kurth Kenyon LLP

(57) ABSTRACT

This invention addresses the problem of providing a press-fit structure and a press-fit method capable of improving the durability of a gear which press-fits into a ring part. As such, the embodiment of this invention is that, while one end side in the central axis direction of the ring gear abuts against a protrusion formed protruding on the outer side of the radial direction of the ring part from the outer circumferential surface of the ring of the ring part, and wherein the press-fit structure press-fits the inner circumferential surface of the gear into the outer circumferential surface of the ring part, when the inner circumferential surface of the gear is press-fitted into the outer circumferential surface of the ring part, there is a tensile strength reduction mechanism reducing the tensile strength generated in the lower portion of the gear teeth in at least the position of the aforementioned end side of the gear.

12 Claims, 18 Drawing Sheets

(52) U.S. Cl.
CPC ......... *F16H 48/40* (2013.01); *F16H 2048/382* (2013.01); *F16H 2048/385* (2013.01); *Y10T 29/49462* (2015.01); *Y10T 29/49465* (2015.01); *Y10T 74/1987* (2015.01)

(58) Field of Classification Search
USPC .................................................. 403/160, 334
See application file for complete search history.

(56) References Cited

FOREIGN PATENT DOCUMENTS

| | | | |
|---|---|---|---|
| EP | 1403537 A1 | 3/2004 | |
| FR | 2580349 A1 | 10/1986 | |
| FR | 2805482 A1 | 8/2001 | |
| JP | 55075515 U * | 5/1980 | ............ B60K 17/16 |
| JP | 61-036747 U | 3/1986 | |
| JP | H07-042713 A | 2/1995 | |
| JP | 2001-235009 A | 8/2001 | |
| JP | 2005-282817 A | 10/2005 | |
| JP | 2010-046695 A | 3/2010 | |
| WO | 2011/145179 A1 | 11/2011 | |
| WO | 2011/145189 A1 | 11/2011 | |
| WO | 2011/151921 A1 | 12/2011 | |

* cited by examiner

PRESS-FIT STRUCTURE AND PRESS-FIT METHOD

CROSS REFERENCE TO RELATED APPLICATION

This is a national phase application based on the PCT International Patent Application No. PCT/JP2011/064956 filed on Jun. 29, 2011, the entire contents of which are incorporated herein by reference.

TECHNICAL FIELD

The present invention relates to a press-fit structure and a press-fit method to press-fit an inner peripheral surface of a gear onto an outer peripheral surface of an annular component.

BACKGROUND ART

As the above type of technique, conventionally, Patent Document 1 discloses a press-fit structure for press-fitting a ring gear onto a flange provided in a differential case until the ring gear comes into contact with a stopper of the flange. After the ring gear is press-fitted on the flange, an entrance portion of a press-fit portion is caulked to fasten the ring gear to the differential case.

RELATED ART DOCUMENTS

Patent Documents

Patent Document 1: EP Application Publication No. 0647789

SUMMARY OF INVENTION

Problems to be Solved by the Invention

However, in the press-fit structure in Patent Document 1, large tensile stress is generated in a part of a tooth-root portion of the ring gear on a side contacting with the stopper of the differential case. This may deteriorate durability of the ring gear.

Specifically, when a ring gear 14 is press-fitted up to a position contacting with a stopper of a flange 12 of a differential case 10, as shown in FIG. 16, the ring gear 14 is pushed up by surface pressure P acting on a press-fit surface 18, thereby generating tensile stress δ in each tooth-root portion 17 of the ring gear 14.

Herein, if the tensile stress δ is uniform in a tooth-width direction (a depth direction perpendicular to the drawing sheet of FIG. 16) of the ring gear 14, it can be treated by readjusting the gear data or specifications of the ring gear 14. However, in fact, the rigidity of the flange 12 is large in a stopper side and thus the surface pressure P is apt to be high near the stopper. Accordingly, large tensile stress δ is generated in the tooth-root portions 17 at a position near the stopper in the tooth-width direction of the ring gear 14 as shown in FIGS. 17 and 18. This tensile stress δ remains in the tooth-root portions 17 even after the ring gear 14 is fastened to the flange 12. Thus, the strength of tooth roots of the ring gear 14 deteriorates, leading to a decrease in durability of the ring gear 14.

FIG. 16 is an enlarged schematic diagram showing a part of the press-fit surface 18 of the ring gear 14 press-fitted on the flange 12. FIG. 17 is a diagram showing an analysis result related to distribution of the tensile stress δ generated in the tooth-root portion 17 of the ring gear 14. In this diagram, a lateral axis indicates the position in the tooth-width direction of the ring gear 14 and a vertical axis indicates the position in the tooth-root portion 17 of the ring gear 14 in the circumferential direction of the ring gear 14. FIG. 18 is a graph showing an analysis result related to distribution of the tensile stress δ generated in the tooth-root portion 17 of the ring gear 14 in the center in the circumferential direction of the ring gear 14. In this graph, a lateral axis indicates the position in the tooth-width direction of the ring gear 14 and a vertical axis indicates a value of the tensile stress δ.

The present invention therefore has a purpose to provide a press-fit structure and a press-fit method capable of enhancing durability of a gear to be press-fitted on an annular component.

Means of Solving the Problems

To achieve the above purpose, one aspect of the invention provides a press-fit structure in which one of end faces of a gear in a central axis direction is placed in contact with a protrusion formed to protrude outward from an outer peripheral surface of an annular component in a radial direction of the annular component, and an inner peripheral surface of the gear is press-fitted on the outer peripheral surface of the annular component, wherein the press-fit structure includes a tensile stress reducing mechanism to reduce tensile stress in a position of at least the one end face of the gear, the tensile stress being generated in a tooth-root portion of the gear when the inner peripheral surface of the gear is press-fitted on the outer peripheral surface of the annular component.

According to the above press-fit structure, there is provided the tensile stress reducing mechanism to reduce the tensile stress which is generated in the tooth-root portion of the gear when the inner peripheral surface of the gear is press-fitted onto the outer peripheral surface of the annular component so that the tensile stress is reduced in the position of at least the one end face of the gear. Therefore, the tensile stress can be reduced in or near a contact portion of the gear tooth-root portion with the protrusion. Thus, a large tensile stress does not remain in the gear tooth-root portion after the inner peripheral surface of the gear is press-fitted on the outer peripheral surface of the annular component. The gear durability can be enhanced.

In the above press-fit structure, preferably, the tensile stress reducing mechanism is configured so that a press-fit allowance between the inner peripheral surface of the gear and the outer peripheral surface of the annular component and in the position of the one end face is set smaller than a press-fit allowance between the inner peripheral surface of the gear and the outer peripheral surface of the annular component and in a position of the other end face of the gear in the central axis direction.

According to the above press-fit structure, the press-fit allowance on the side of the one end face of the gear is set smaller than the press-fit allowance on the side of the other end face of the gear. Accordingly, the tensile stress can be surely reduced in or near the contact portion of the gear tooth-root portion with the protrusion. This can reliably reduce the tensile stress which may remain in the tooth-root portion of the gear after the inner peripheral surface of the gear is press-fitted on the outer peripheral surface of the annular component. The gear durability can thus be positively enhanced.

In the above press-fit structure, preferably, the inner peripheral surface of the gear is formed with an inner diameter gradually larger as being closer to the one end face in the central axis direction of the gear.

According to the above press-fit structure, the inner peripheral surface of the gear is formed with the inner diameter gradually larger as being closer to the one end face. Thus, the press-fit allowance between the inner peripheral surface of the gear and the outer peripheral surface of the annular component can be gradually smaller as being closer to the one end face side. This makes it possible to largely reduce the tensile stress generated in the tooth-root portion of the gear.

In the above press-fit structure, preferably, the outer peripheral surface of the annular component is formed with an outer diameter gradually smaller as being closer to the protrusion in the central axis direction of the annular component.

According to the above press-fit structure, the outer peripheral surface of the annular component is formed with the outer diameter gradually smaller as being closer to the protrusion. Thus, the press-fit allowance between the inner peripheral surface of the gear and the outer peripheral surface of the annular component can be gradually smaller as being closer to the one end face side. This can greatly reduce the tensile stress generated in the tooth-root portion of the gear.

In the above press-fit structure, preferably, the inner peripheral surface of the gear includes a press-fit portion with respect to the outer peripheral surface of the annular component and an outside clearance portion between the one end face and the press-fit portion, the outside clearance portion being recessed more outward than the press-fit portion in a radial direction of the gear.

According to the above press-fit structure, the inner peripheral surface of the gear includes the outside clearance portion formed between the press-fit portion fitted with the outer peripheral surface of the annular component and the one end face of the gear in the central axis direction, and formed to be recessed outward in the radial direction of the gear. Thus, a part of the gear near the one end face is not press-fitted on the annular component. Accordingly, the tensile stress can be largely reduced in or near the contact portion of the tooth-root portion of the gear with the protrusion.

In the above press-fit structure, preferably, the outer peripheral surface of the annular component includes a press-fit portion with respect to the inner peripheral surface of the gear and an inside clearance portion formed between the protrusion and the press-fit portion, the inside clearance portion being recessed more inward than the press-fit portion in a radial direction of the annular component.

According to the above press-fit structure, the outer peripheral surface of the annular component includes the inside clearance portion formed between the protrusion and the press-fit portion in the central axis direction of the annular component and formed to be recessed inward in the radial direction. Thus, a part of the gear near the one end face is not press-fitted on the annular component. Accordingly, the tensile stress can be largely reduced in or near the contact portion of the tooth-root portion of the gear with the protrusion.

In the above press-fit structure, preferably, the tensile stress reducing mechanism includes a cutout formed in the protrusion and recessed inward in a radial direction of the annular component.

According to the above press-fit structure, including the cutout formed in the protrusion and recessed inward in the radial direction, the rigidity of the protrusion in the radial direction can be decreased. Accordingly, the tensile stress can be reliably reduced in or near the contact portion of the tooth-root portion of the gear with the protrusion. This can surely reduce the tensile stress which may remain in the tooth-root portion of the gear after the inner peripheral surface of the gear is press-fitted on the outer peripheral surface of the annular component. Consequently, the durability of the gear can be reliably enhanced.

In the above press-fit structure, preferably, the gear includes a rib protruding from the one end face in the central axis direction of the gear, and the cutout and the rib engage with each other.

According to the above press-fit structure, the cutout formed in the protrusion and the rib formed in the gear are engaged with each other. Thus, for example, when the press-fit structure works to transmit torque, the cutout and the rib contribute to transmission of the torque. Therefore, in the fastening structure in which the inner peripheral surface of the gear is press-fitted on the outer peripheral surface of the annular component and then the gear and the annular component are fastened to each other, even when the torque transmission is performed, the strength of fastening portions of the gear and the annular component can be increased.

In the above press-fit structure, preferably, the gear is a ring gear of a differential device, and the annular component is a flange provided in a differential case of the differential device.

According to the above press-fit structure, in the differential device in which the ring gear is press-fitted on the flange provided in the differential case, the durability of the ring gear can be enhanced.

Another aspect of the invention to achieve the above purpose provides, a press-fit method including press-fitting an inner peripheral surface of a gear onto an outer peripheral surface of an annular component, and bringing one of end faces of the gear in a central axis direction into contact with a protrusion protruding outward from the outer peripheral surface of the annular component in a radial direction of the annular component, wherein the method further includes reducing tensile stress in a position of at least the one end face of the gear, the tensile stress being generated in a tooth-root portion of the gear when the inner peripheral surface of the gear is press-fitted onto the outer peripheral surface of the annular component.

According to the above press-fit method, the tensile stress which is generated in the tooth-root portion of the gear when the inner peripheral surface of the gear is press-fitted onto the outer peripheral surface of the annular component is reduced in the position of at least the one end face of the gear. Therefore, the tensile stress can be reduced in or near a contact portion of the gear tooth-root portion with the protrusion. Thus, a large tensile stress does not remain in the gear tooth-root portion after the inner peripheral surface of the gear is press-fitted on the outer peripheral surface of the annular component. The gear durability can be enhanced.

In the above press-fit method, preferably, a press-fit allowance between the inner peripheral surface of the gear and the outer peripheral surface of the annular component and in the position of the one end face is set smaller than a press-fit allowance between the inner peripheral surface of the gear and the outer peripheral surface of the annular component and in a position of the other end face of the gear in the central axis direction.

According to the above press-fit method, the press-fit allowance on the side of the one end face of the gear is set smaller than the press-fit allowance on the side of the other end face of the gear. Accordingly, the tensile stress can be surely reduced in or near the contact portion of the gear tooth-root portion with the protrusion. This can reliably reduce the tensile stress which may remain in the tooth-root portion of the gear after the inner peripheral surface of the gear is press-fitted on the outer peripheral surface of the annular component. The gear durability can thus be positively enhanced.

In the above press-fit method, preferably, the inner peripheral surface of the gear is formed with an inner diameter gradually larger as being closer to the one end face in the central axis direction of the gear.

According to the above press-fit method, the inner peripheral surface of the gear is formed with the inner diameter gradually larger as being closer to the one end face. Thus, the press-fit allowance between the inner peripheral surface of the gear and the outer peripheral surface of the annular component can be gradually smaller as being closer to the one end face side. This makes it possible to largely reduce the tensile stress generated in the tooth-root portion of the gear.

In the above press-fit method, preferably, the outer peripheral surface of the annular component is formed with an outer diameter gradually smaller as being closer to the protrusion in the central axis direction of the annular component.

According to the above press-fit method, the outer peripheral surface of the annular component is formed with the outer diameter gradually smaller as being closer to the protrusion. Thus, the press-fit allowance between the inner peripheral surface of the gear and the outer peripheral surface of the annular component can be gradually smaller as being closer to the one end face side. This can greatly reduce the tensile stress generated in the tooth-root portion of the gear.

In the above press-fit method, preferably, the inner peripheral surface of the gear includes a press-fit portion with respect to the outer peripheral surface of the annular component and an outside clearance portion between the one end face and the press-fit portion, the outside clearance portion being recessed more outward than the press-fit portion in a radial direction of the gear.

According to the above press-fit method, the inner peripheral surface of the gear includes the outside clearance portion formed between the press-fit portion fitted with the outer peripheral surface of the annular component and the one end face of the gear in the central axis direction, and formed to be recessed outward in the radial direction of the gear. Thus, a part of the gear near the one end face is not press-fitted on the annular component. Accordingly, the tensile stress can be largely reduced in or near the contact portion of the tooth-root portion of the gear with the protrusion.

In the above press-fit method, preferably, the outer peripheral surface of the annular component includes a press-fit portion with respect to the inner peripheral surface of the gear and an inside clearance portion formed between the protrusion and the press-fit portion, the inside clearance portion being recessed more inward than the press-fit portion in a radial direction of the annular component.

According to the above press-fit method, the outer peripheral surface of the annular component includes the inside clearance portion formed between the protrusion and the press-fit portion and formed to be recessed inward in the radial direction. Thus, a part of the gear near the one end face is not press-fitted on the annular component. Accordingly, the tensile stress can be largely reduced in or near the contact portion of the tooth-root portion of the gear with the protrusion.

In the above press-fit method, preferably, the tensile stress reducing mechanism includes a cutout formed in the protrusion and recessed inward in a radial direction of the annular component.

According to the above press-fit method, including the cutout formed in the protrusion and recessed inward in the radial direction, the rigidity of the protrusion in the radial direction can be decreased. Accordingly, the tensile stress can be reliably reduced in or near the contact portion of the tooth-root portion of the gear with the protrusion. This can surely reduce the tensile stress which may remain in the tooth-root portion of the gear after the inner peripheral surface of the gear is press-fitted on the outer peripheral surface of the annular component. Consequently, the durability of the gear can be reliably enhanced.

In the above press-fit method, preferably, the gear includes a rib protruding from the one end face in the central axis direction of the gear, and the cutout and the rib engage with each other.

According to the above press-fit method, the cutout formed in the protrusion and the rib formed in the gear are engaged with each other. Thus, for example, when the press-fit structure works to transmit torque, the cutout and the rib contribute to transmission of the torque. Therefore, in the fastening structure in which the inner peripheral surface of the gear is press-fitted on the outer peripheral surface of the annular component and then the gear and the annular component are fastened to each other, even when the torque transmission is performed, the strength of fastening portions of the gear and the annular component can be increased.

In the above press-fit method, preferably, the gear is a ring gear of a differential device, and the annular component is a flange provided in a differential case of the differential device.

According to the above press-fit method, in the differential device in which the ring gear is press-fitted on the flange provided in the differential case, the durability of the ring gear can be enhanced.

Effects of the Invention

According to a press-fit structure and a press-fit method of the present invention, the durability of a gear to be press-fitted on an annular component can be enhanced.

MODE FOR CARRYING OUT THE INVENTION

A detailed description of a preferred embodiment of the present invention will now be given referring to the accompanying drawings. The following example shows a press-fit structure and a press-fit method of a differential case and a ring gear which are components of a differential sub-assembly (a differential device) of a vehicle such as a car. Besides, the present invention is applicable to a press-fit structure and a press-fit method of various components.

Example 1

Example 1 is first explained.

(Outline of Differential Sub-assembly)

Figure 1:
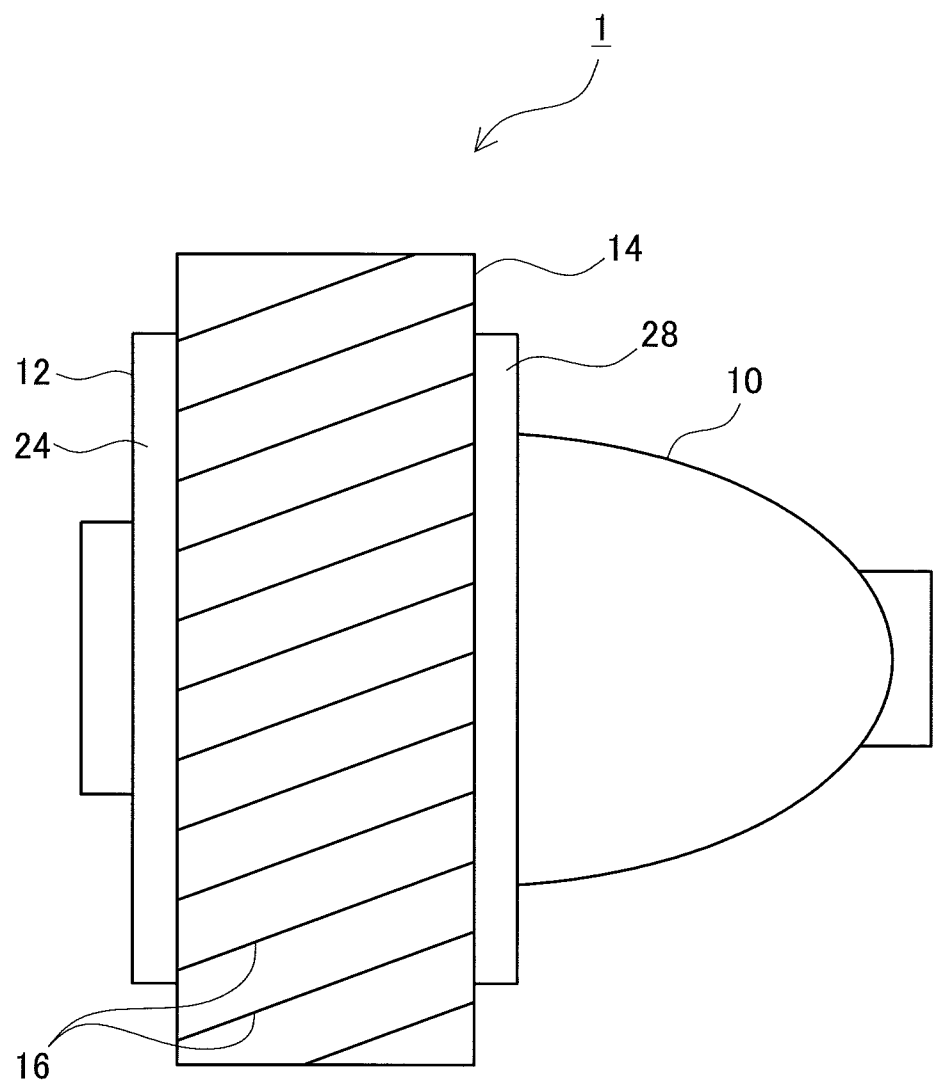
FIG. 1 is a side view showing a schematic structure of a differential sub-assembly.
Figure 2:
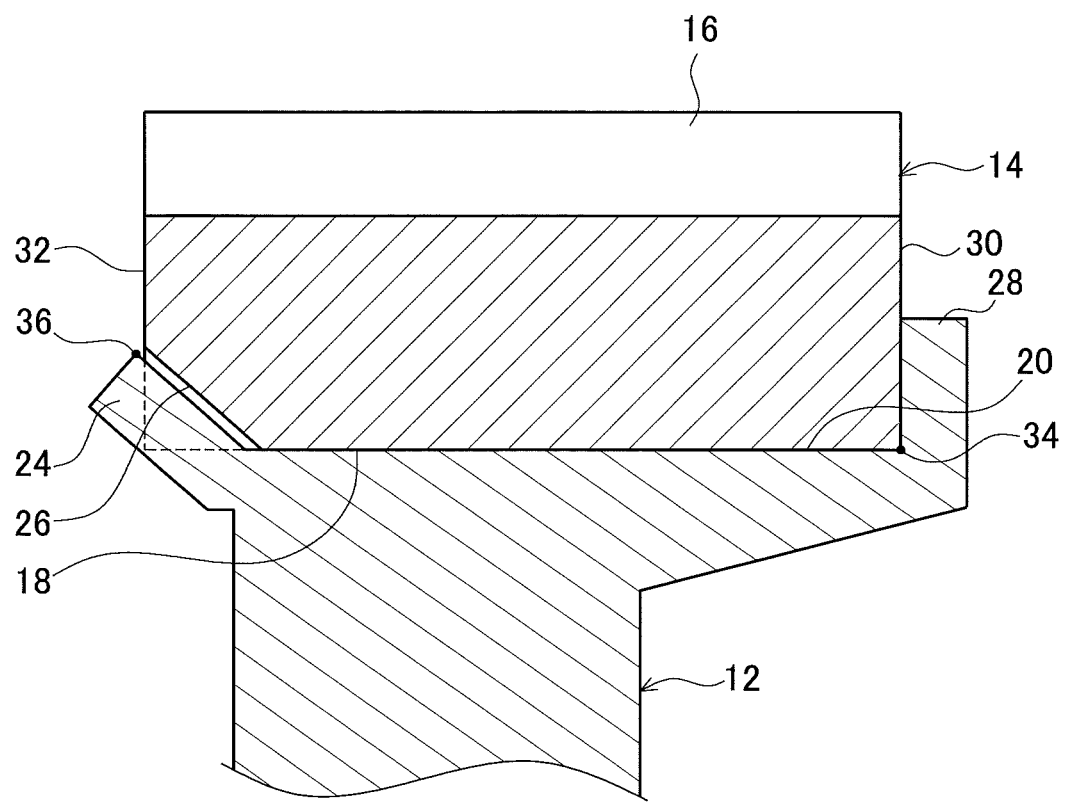
FIG. 2 is an enlarged cross sectional view showing fastening portions of a flange of a differential case and a ring gear.

FIG. 1 is a side view showing a schematic structure of a differential sub-assembly 1. FIG. 2 is an enlarged cross sectional view showing a fastening portion of a flange 12 of a differential case 10 and a ring gear 14. As shown in FIG. 1, the differential sub-assembly 1 includes the differential case 10, the annular flange 12 provided on the outer periphery of the differential case 10 on one end side (a left side in FIG. 1), and an annular ring gear 14 press-fitted and fastened onto the flange 12. In this way, a press-fit structure is made up of the flange 12 and the ring gear 14. In the differential case 10, a pair of side gears (not shown) and a pair of pinions (not shown) are housed in a rotatably supported state. The differential sub-assembly 1 is one example of a "differential device" of the invention. The flange 12 is one example of an "annular component" of the invention. The ring gear 14 is one example of a "gear" of the invention.

This differential sub-assembly 1 is used in a power transmission mechanism of a vehicle. For instance, it is provided in a transmission, transfer, final reduction gear, and others in a vehicle. The differential sub-assembly 1 transmits power input in the ring gear 14 from a counterpart gear (not shown) to a rotary member (not shown) coupled to a pair of pinions while allowing a rotation difference between the pair of side gears. The rotary member is, for example, a pair of right and left drive wheels of a vehicle, and a pair of front and rear drive wheels of a vehicle.

As shown in FIG. 2, the flange 12 includes a stopper 28 on one end side (a right side in FIG. 2) in a central axis direction (a right and left direction in FIG. 2). This stopper 28 is formed to protrude outward in a radial direction of the flange 12 from the outer peripheral surface of the flange 12. The flange 12 is further includes a caulking portion 24 on the other end side (a left side in FIG. 2) in the central axis direction. The stopper 28 is one example of a "protrusion" of the invention.

The ring gear 14 is constituted of a helical gear as shown in FIGS. 1 and 2 formed with a plurality of teeth 16 on the outer periphery. The teeth 16 are arranged oblique to the axial direction (a right and left direction in FIG. 1) of the ring gear 14. This ring gear 14 is press-fitted, by a press-fit surface 18 formed on its inner peripheral surface, onto a press-fit surface 20 formed on the outer peripheral surface of the flange 12 and, more particularly, caulked by the caulking portion 24 of the flange 12 as will be described later. The ring gear 14 is selectable from any other gears such as a spur wheel as well as the helical gear.

The ring gear 14 is provided with a first end face 30 on one end side (a right side in FIG. 2) in the central axis direction. This first end face 30 is in contact with the stopper 28. The ring gear 14 is provided with a second end face 32 on the other end side (a left side in FIG. 2) in the central axis direction.

Figure 3:
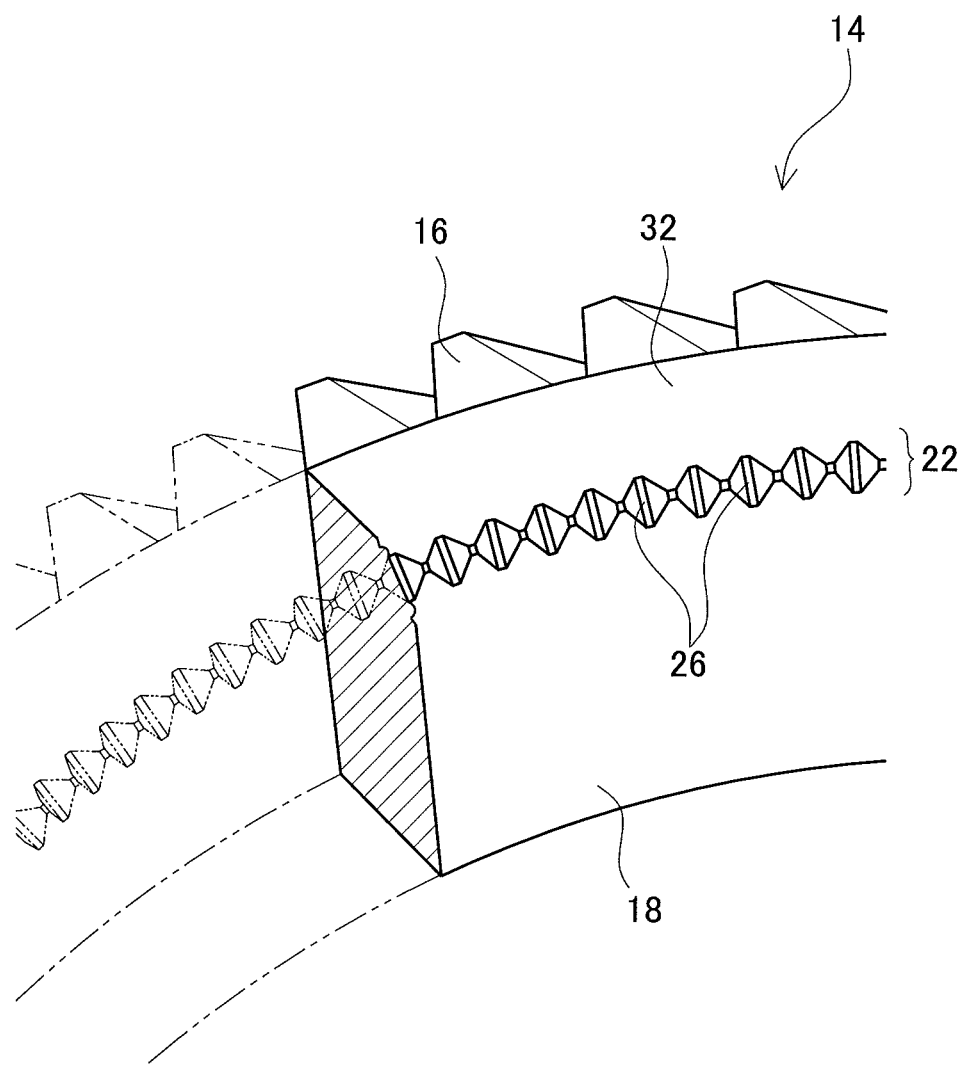
FIG. 3 is a schematic view of an inner peripheral edge of the ring gear and its surroundings.

The ring gear 14 includes notches 26 in an inner peripheral edge portion 22 on the other end side (the left side in FIG. 2) in the central axis direction as shown in FIG. 3. The notches 26 are to be caulked by the caulking portion 24. The notches 26 are provided at intervals in the circumferential direction of the ring gear 14. Each notch 26 is formed as a recess when seen in the central axis direction of the ring gear 14 so that the bottom of the recessed shape is oblique to the radial direction (a top and bottom direction in FIG. 2) and the central axis direction (the right and left direction in FIG. 2) of the ring gear 14. FIG. 3 is a perspective view showing the inner peripheral edge portion 22 and its surroundings in the ring gear 14.

(Method for fastening Differential Case and Ring Gear)

Figure 4:
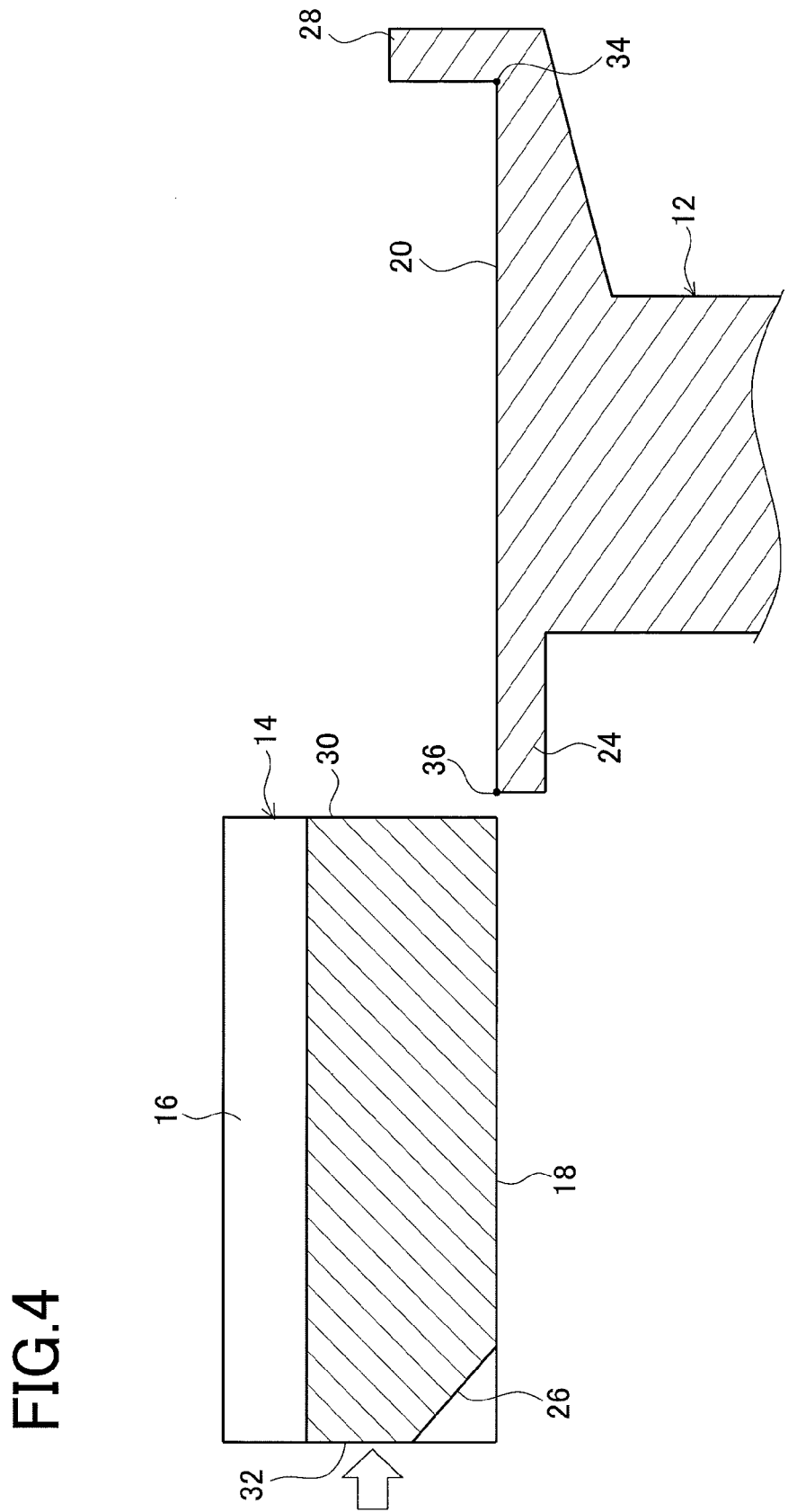
FIG. 4 is an explanatory view showing a press-fit process to press-fit the ring gear onto the flange of the differential case.
Figure 5:
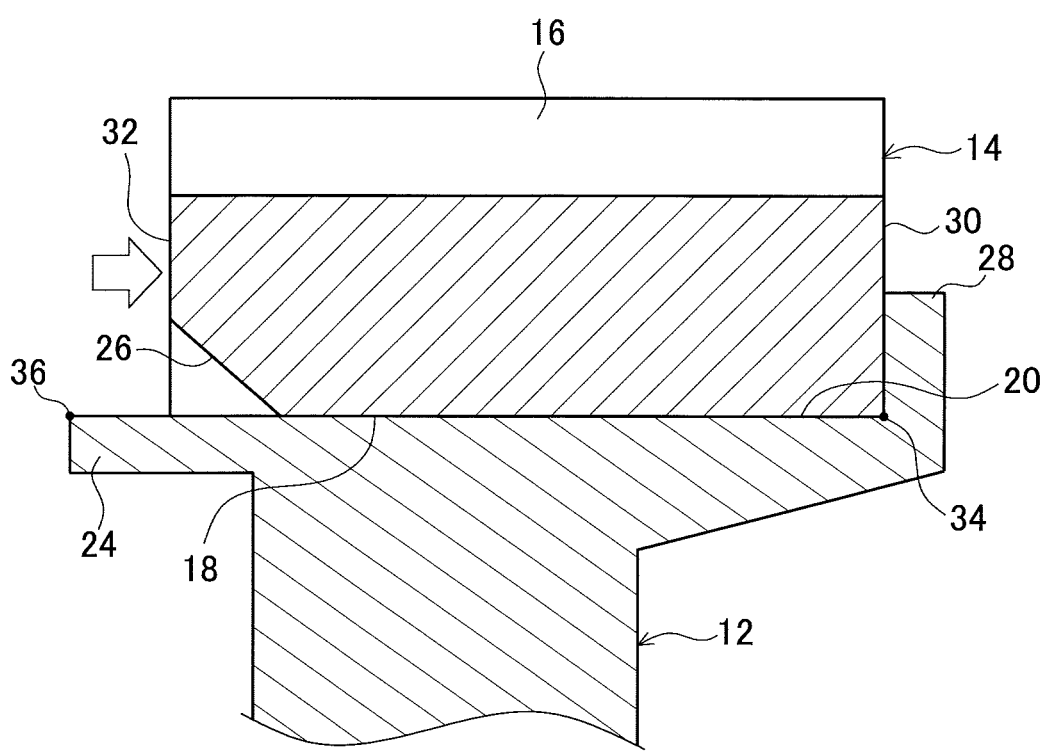
FIG. 5 is another explanatory view showing the press-fit process to press-fit the ring gear onto the flange of the differential case.

In a method for fastening the differential case 10 and the ring gear 14, a press-fit method in a press-fit process and a caulking method in a caulking process will be explained below. In the press-fit process, as shown in FIGS. 4 and 5, the press-fit surface 18 of the ring gear 14 is press-fitted on the press-fit surface 20 of the flange 12 until the first end face 30 of the ring gear 14 comes into contact with the stopper 28. Accordingly, the press-fit surface 18 is allowed to be press-fitted on the press-fit surface 20 while positioning the flange 12 and the ring gear 14 in place. At that time, the caulking portion 24 of the flange 12 is in a state extending in parallel with the press-fit surface 20.

In the caulking process, the caulking portion 24 of the flange 12 is pressed against the notches 26 of the ring gear 14 to caulk them. To be concrete, the caulking portion 24 of the flange 12 is deformed by plastic forming to be pressed and spread from inside to outside (lower side to upper side in FIG. 5) in the radial direction of the ring gear 14. Accordingly, as shown in FIG. 2, the caulking portion 24 of the flange 12 is pressed against and fixed to the notches 26 of the ring gear 14. In the above way, the ring gear 14 is fixed by caulking to the flange 12. As above, the ring gear 14 is fastened to the flange 12 of the differential case 10.

(Explanation of Tensile Stress Reducing Mechanism)

Herein, in the press-fit process, when the press-fit surface 18 of the ring gear 14 is being press-fitted onto the press-fit surface 20 of the flange 12 of the differential case 10, the tensile stress δ is generated in tooth-root portions 17 of the ring gear 14. Thus, a tensile stress reducing mechanism for reducing the tensile stress δ will be explained below.

Figure 6:
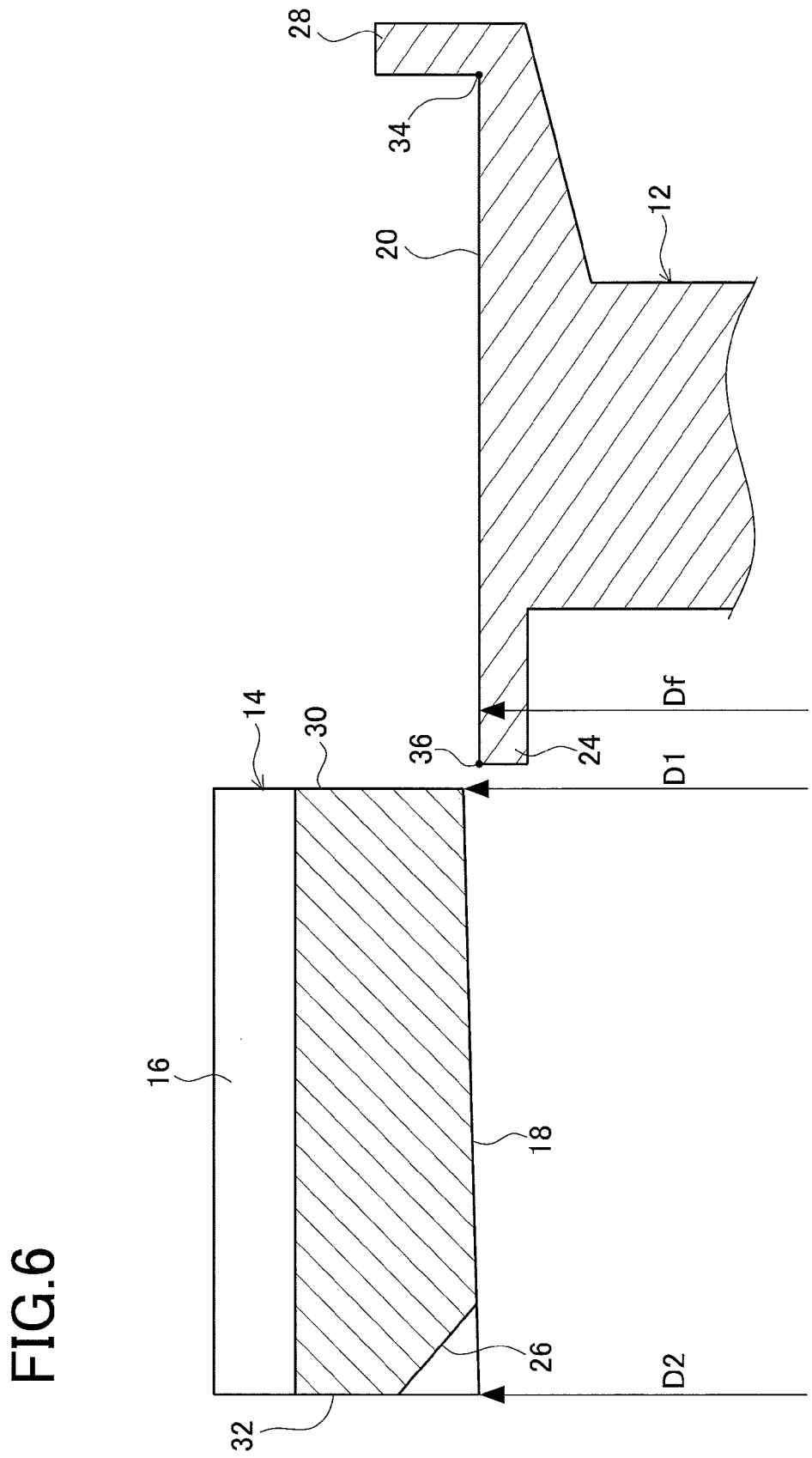
FIG. 6 is a view showing an inner diameter of a ring gear and an outer diameter of a flange of a differential case in Example 1.

The tensile stress reducing mechanism in Example 1 is arranged to adjust the inner diameter of the ring gear 14 to thereby adjust the size of a press-fit allowance between the press-fit surface 18 of the ring gear 14 and the press-fit surface 20 of the flange 12. As shown in FIG. 6, concretely, the ring gear 14 is designed so that the inner diameter of the ring gear 14 is gradually larger as being closer from a position corresponding to the second end face 32 to a position corresponding to the first end face 30 in the central axis direction (the right and left direction in FIG. 6) of the ring gear 14. Accordingly, the inner diameter D1 of the first end face 30 and the inner diameter D2 of the second end face 32 establish a relationship represented by the following expression:

$$D1 > D2 \quad \text{(Exp. 1)}$$

As shown in FIG. 6, the first end face 30 is an end face located on a side which contacts with the stopper 28 of the differential case 10 in the central axis direction of the ring gear 14, and the second end face 32 is an end face on a side formed with the notches 26 in the central axis direction of the ring gear 14.

On the other hand, the outer diameter Df of the flange 12 of the differential case 10 is set to be constant in the central axis direction (the right and left direction in FIG. 6) of the differential case 10. Accordingly, the press-fit allowance between the press-fit surface 18 of the ring gear 14 and the press-fit surface 20 of the flange 12 is set to be gradually smaller as being closer from the position of the second end face 32 to the position of the first end face 30 in the central axis direction of the ring gear 14. Thus, the tensile stress δ can be reduced in the tooth-root portions 17 of the ring gear 14 in at least the position of the first end face 30 (the portion contacting with the stopper 28) and its surroundings. Therefore, a large tensile stress δ does not remain in the tooth-root portions 17 of the ring gear 14.

Herein, such a case as the conventional art is explained, in which the inner diameter of the ring gear 14 is constant in the central axis direction of the ring gear 14. In this case, it is assumed that, when the ring gear 14 is press-fitted on the flange 12, in the tooth-root portion 17 of the ring gear 14 in the center in the circumferential direction thereof, the tensile stress δ1 generated in the position of the first end face 30 and the tensile stress δ2 generated in the position of the second end face 32 have a ratio expressed as below:

$$\delta 1 : \delta 2 = X : 1 \quad \text{(Exp. 2)}$$

In Example 1, in such a case, it is preferable to set the inner diameter D1 of the ring gear 14 in the position of the first end face 30 and the inner diameter D2 in the position of the second end face 32 as below:

$$D1 : D2 = X : 1 \quad \text{(Exp. 3)}$$

(Effects of Present Example)

According to Example 1 as mentioned above, there is provided the tensile stress reducing mechanism to reduce the tensile stress δ in at least the position of the first end face 30 of the ring gear 14, the tensile stress δ being generated in the tooth-root portions 17 of the ring gear 14 when the press-fit surface 18 of the ring gear 14 is press-fitted onto the press-fit surface 20 of the flange 12. Therefore, the tensile stress δ can be reduced in or near a contact portion of each tooth-root portion 17 of the ring gear 14 with the stopper 28. This prevents a large tensile stress δ from remaining in the tooth-root portions 17 of the ring gear 14 and thus enhances the durability of the ring gear 14.

As the tensile stress reducing mechanism, to be concrete, the press-fit allowance between the press-fit surface 18 and the press-fit surface 20 in the position of the first end face 30 of the ring gear 14 is made smaller than the press-fit allowance between the press-fit surface 18 and the press-fit surface 20 in the position of the second end face 32 of the ring gear 14. Accordingly, the tensile stress δ can be reliably reduced in or near the contact portion of each tooth-root portion 17 of the ring gear 14 with the stopper 28. Therefore, the durability of the ring gear 14 can be surely enhanced.

The press-fit surface 18 of the ring gear 14 is designed with the inner diameter gradually increasing as being closer to the first end face 30. Thus, the press-fit allowance between the press-fit surface 18 and the press-fit surface 20 can be made gradually smaller as being closer to the first end face 30 side. This can more greatly reduce the tensile stress δ and further enhance the durability of the ring gear 14.

It is preferable that the press-fit allowance is set to be gradually smaller as being closer to the position of the first end face 30 from the second end face 32 so that the tensile stress δ generated in the tooth-root portions 17 of the ring gear 14 is uniform over the tooth-width direction.

In machining the press-fit surface 18 of the ring gear 14, the press-fit surface 18 may be cut by a cutting tool from the first end face 30 to the second end face 32 or from the second end face 32 to the first end face 30. Since the cutting direction by the cutting tool is not limited as above, the press-fit surface 18 of the ring gear 14 can be easily machined.

In the above press-fit process, since the ring gear 14 is press-fitted onto the flange 12 in a direction that the press-fit allowance between the press-fit surface 18 and the press-fit surface 20 is gradually smaller, a work to press-fit the ring gear 14 onto the flange 12 is easy.

When the inner diameter D1 of the first end face 30 of the ring gear 14 and the inner diameter D2 of the second end face 32 are set with the ratio represented by the above expression 3, it is possible to effectively reduce the tensile stress δ which may be largely generated in the tooth-root portions 17 at the first end face 30 of the ring gear 14 in the center in the circumferential direction of the ring gear 14. Thus, the duration of the ring gear 14 can be enhanced remarkably.

Example 2

Figure 7:
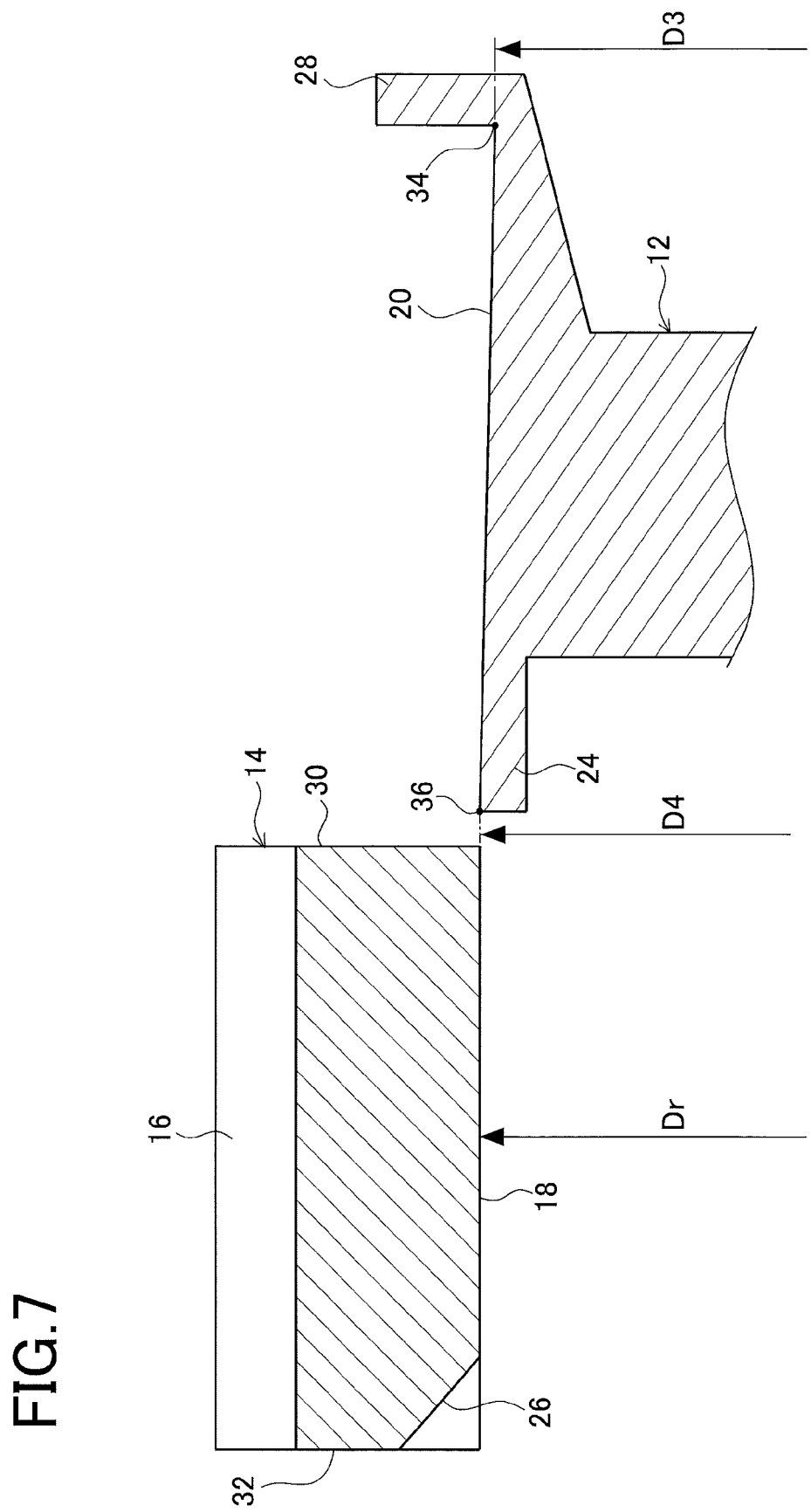
FIG. 7 is a view showing an outer diameter of a flange of a differential case and an inner diameter of a ring gear in Example 2.

Example 2 will be explained below. In the following explanation, the components similar or identical components to those in Example 1 are given the same reference signs and their details are not repeated. The following explanation is made with a focus on differences from Example 1. A tensile stress reducing mechanism in Example 2 is configured to adjust the press-fit allowance between the press-fit surface 18 of the ring gear 14 and the press-fit surface 20 of the flange 12 by adjusting the outer diameter of the flange 12 of the differential case 10. Specifically, as shown in FIG. 7, the outer diameter of the flange 12 is set to be gradually smaller as being closer to a first end 34 from a second end 36 in the central axis direction of the flange 12. Accordingly, the outer diameter D3 of the first end 34 and the outer diameter D4 of the second end 36 establish a relationship represented by the following expression:

$$D3<D4 \quad \text{(Exp. 4)}$$

As shown in FIG. 7, the first end 34 is an end of the press-fit surface 20 on a side formed with the stopper 28 in the central axis direction of the flange 12 (that is, a boundary with the stopper 28). The second end 36 is an end of the press-fit surface 20 on a side formed with the caulking portion 24 in the central axis direction of the flange 12.

On the other hand, the inner diameter Dr of the ring gear 14 is set to be constant in the central axis direction of the ring gear 14. Accordingly, similar to Example 1, the press-fit allowance between the press-fit surface 18 of the ring gear 14 and the press-fit surface 20 of the flange 12 is set to be gradually smaller as being closer to the position of the first end face 30 from the position of the second end face 32 in the central axis direction of the ring gear 14.

When a ratio between the tensile stress M and the tensile stress δ2 is represented by the above expression 2, it is preferable to set the outer diameter D3 in the position of the first end 34 and the outer diameter D4 in the position of the second end 36 as below:

$$D3:D4=1:X \quad \text{(Exp. 5)}$$

According to Example 2, similar to Example 1 mentioned above, the press-fit allowance between the press-fit surface 18 and the press-fit surface 20 in the position of the first end face 30 of the ring gear 14 is set to be smaller than the press-fit allowance between the press-fit surface 18 and the press-fit surface 20 in the position of the second end face 32 of the ring gear 14. Thus, the tensile stress δ can be reliably reduced in or near the contact portion of each tooth-root portion 17 of the ring gear 14 with the stopper 28. This prevents a large tensile stress δ from remaining in the tooth-root portions 17 of the ring gear 14. Thus, the durability of the ring gear 14 can surely enhanced.

The press-fit surface 20 of the flange 12 is designed so that the outer diameter is gradually smaller as being closer to the first end 34. Therefore, the press-fit allowance between the press-fit surface 18 and the press-fit surface 20 can be set to be gradually smaller as being closer to the first end 34. This makes it possible to largely reduce the tensile stress δ and further enhance the durability of the ring gear 14.

The press-fit surface 20 of the flange 12 is designed with the outer diameter gradually larger as being closer to the position of the second end 36 from the position of the first end portion 34. Therefore, the ring gear 14 press-fitted on the flange 12 from the second end 36 side is not allowed to easily return toward the second end 36 of the flange 12. This enhances fastening strength between the differential case 10 and the ring gear 14.

When the inner diameter D3 of the first end 34 and the inner diameter D4 of the second end 36 of the flange 12 are set with the ratio represented by the expression 5, it is possible to efficiently reduce the tensile stress δ which may be largely generated in the tooth-root portions 17 of the first end face 30 of the ring gear 14 in the center in the circumferential direction of the ring gear 14. Thus, the durability of the ring gear 14 can be remarkably enhanced.

Example 3

Figure 8:
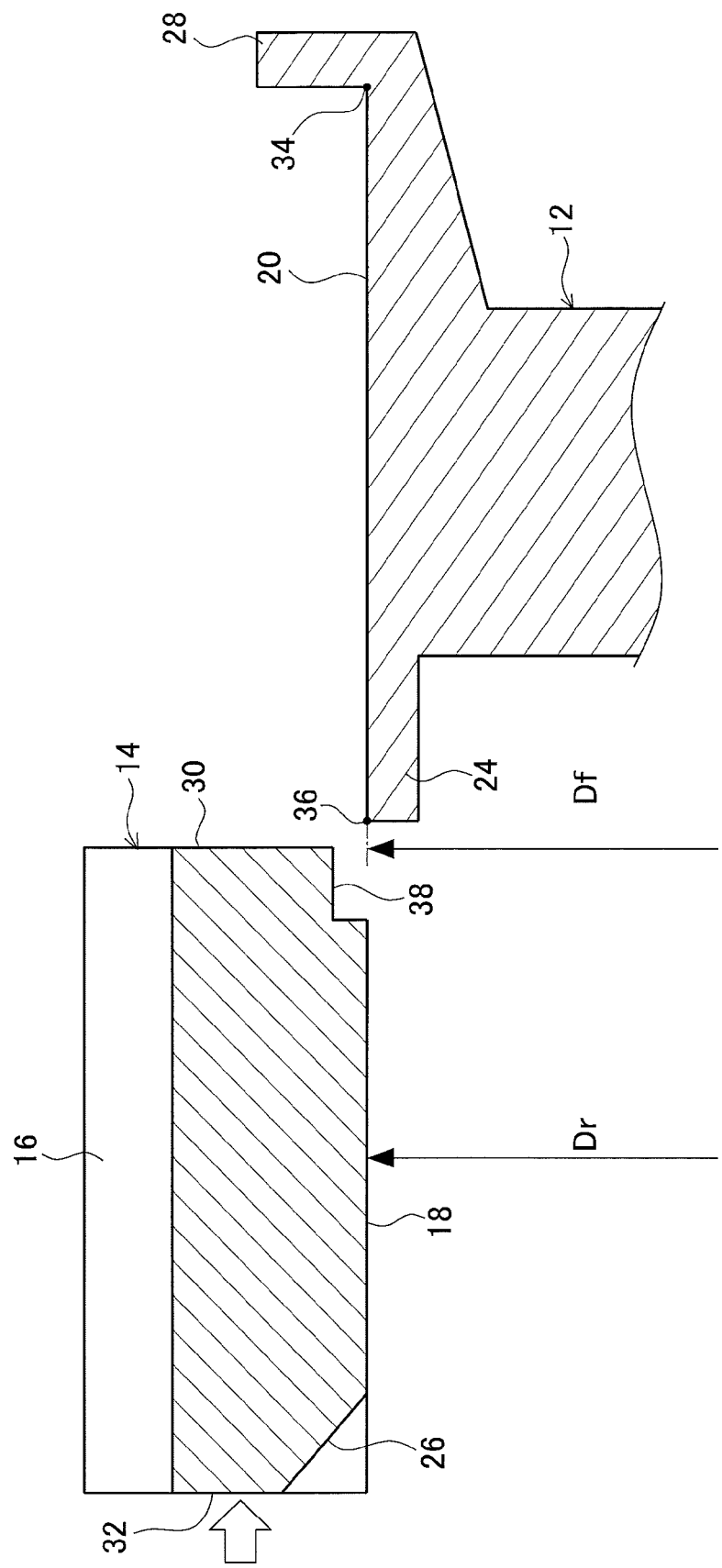
FIG. 8 is a view showing an example in which a ring gear is formed with an outside clearance portion in Example 3.

Example 3 will be explained below. In the following explanation, similar or identical components to those in Examples 1 and 2 are given the same reference signs and their details are not repeated. The following explanation is made with a focus on differences from Examples 1 and 2. In Example 3, a tensile stress reducing mechanism includes an outside clearance portion 38 formed in the inner peripheral surface of the ring gear 14, as shown in FIG. 8. The outside clearance portion 38 is formed in the inner peripheral surface of the ring gear 14 and between the first end face 30 and the press-fit surface 18 in the central axis direction of the ring gear 14.

Figure 9:
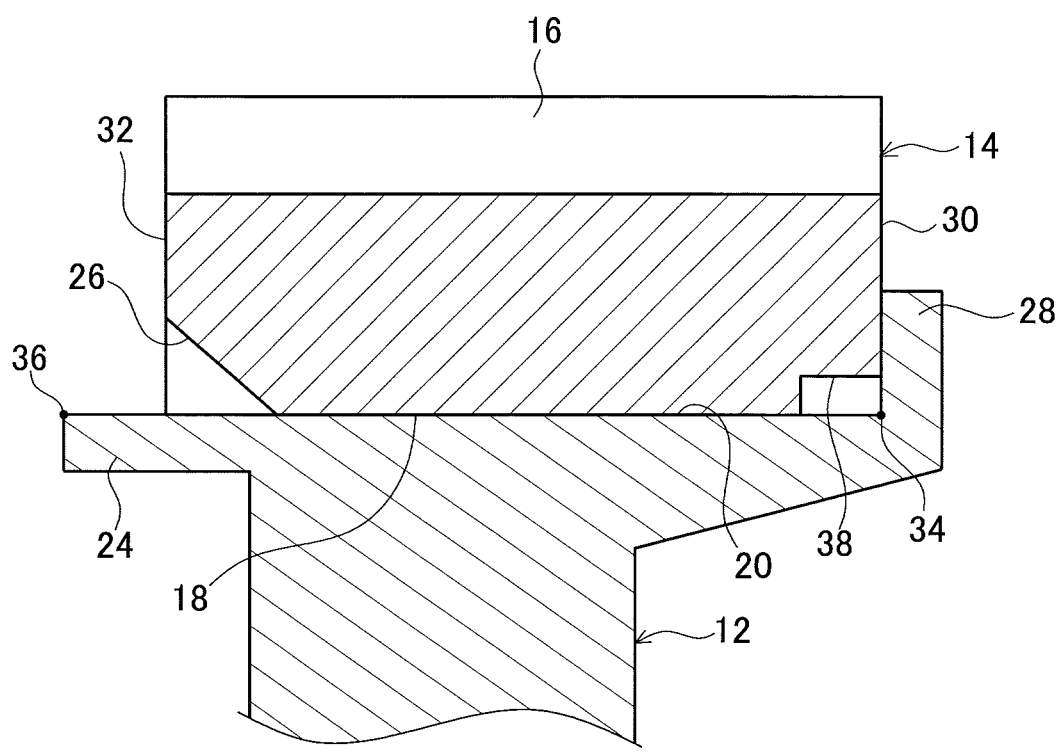
FIG. 9 is a view showing that the ring gear is press-fitted on a flange of a differential case in Example 3.

The outside clearance portion 38 is formed with the inner diameter larger than the inner diameter Dr of the press-fit surface 18 which is a press-fit portion with respect to the press-fit surface 20 of the flange 12. In this way, the outside clearance portion 38 is formed to be recessed more outward in the radial direction of the ring gear 14 than the press-fit surface 18. The outer diameter Df of the press-fit surface 20 of the flange 12 is set to be constant in the central axis direction of the differential case 10. Accordingly, as shown in FIG. 9, when the press-fit surface 18 of the ring gear 14 is press-fitted on the press-fit surface 20 of the flange 12, a part of the ring gear 14 formed with the outside clearance portion 38 is not press-fitted on the press-fit surface 20 of the flange 12. Specifically, the press-fit allowance between the inner peripheral surface of the ring gear 14 in the position of the first end face 30 of the ring gear 14 and the outer peripheral surface of the flange 12 is zero, so that this press-fit allowance is smaller than the press-fit allowance between the inner peripheral surface of the ring gear 14 in the position of the second end face 32 of the ring gear 14 and the outer peripheral surface of the flange 12.

Figure 17:
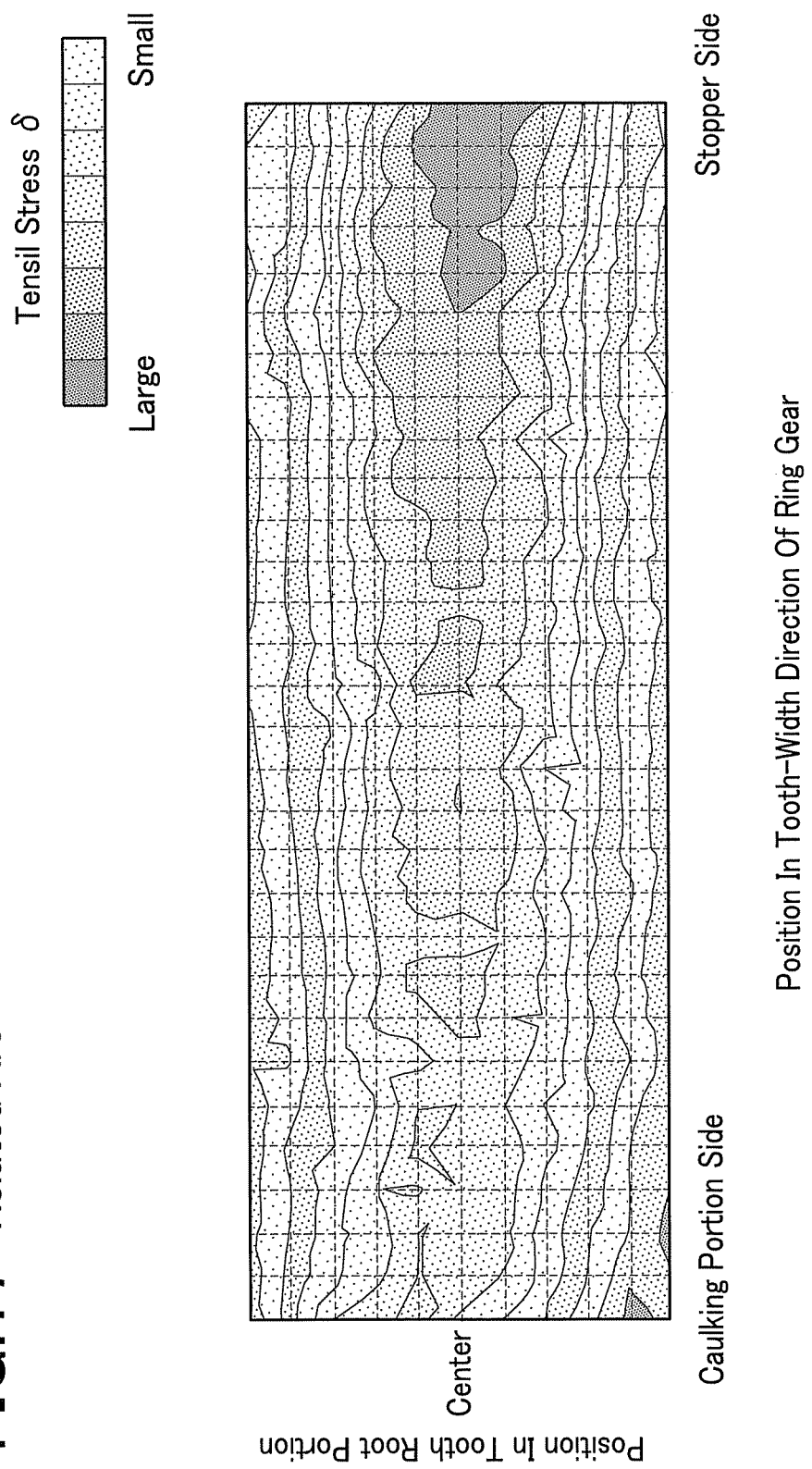
FIG. 17 is a diagram showing an analysis result related to distribution of tensile stress generated in a tooth-root portion of a ring gear.
Figure 18:
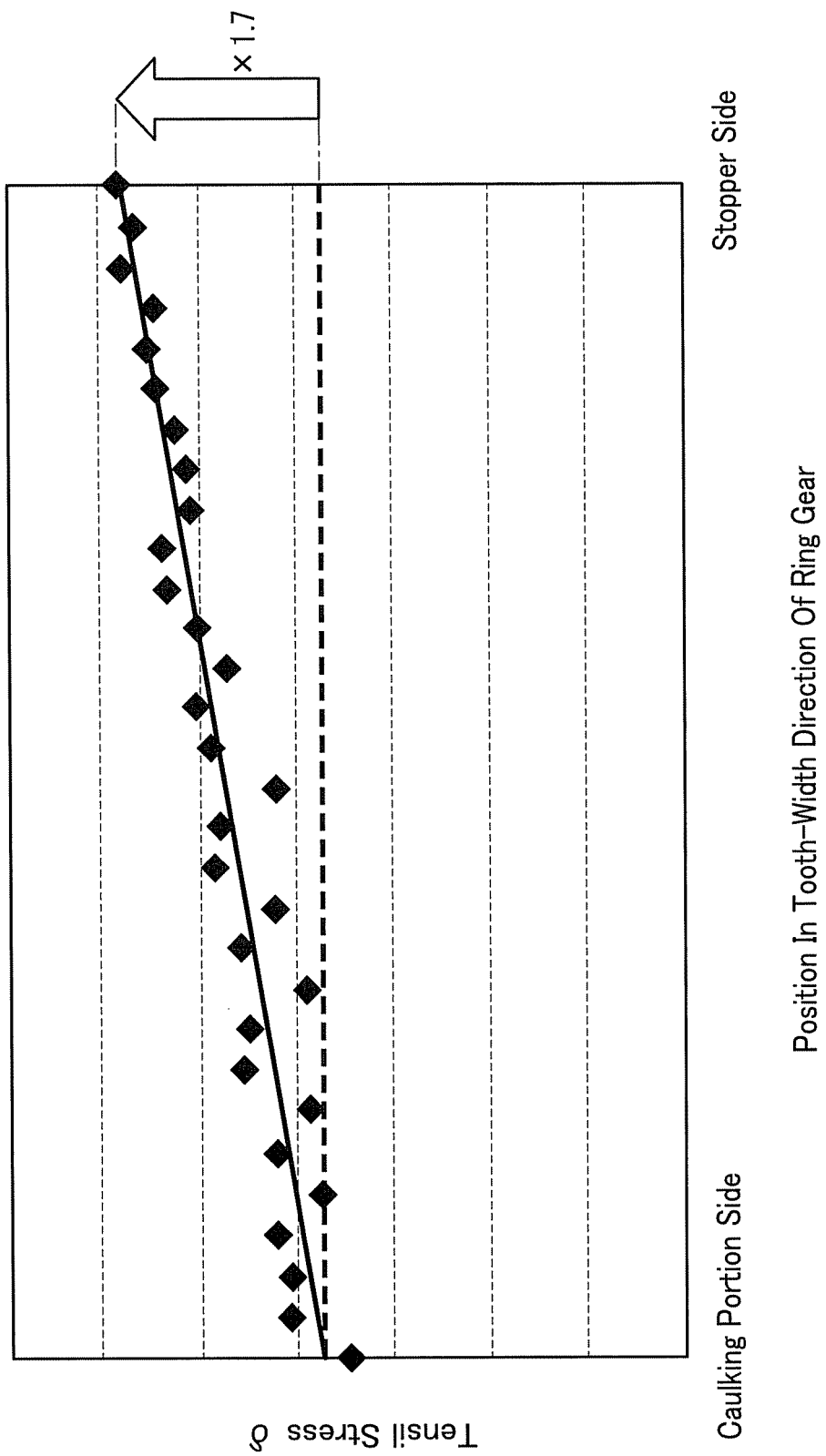
FIG. 18 is a diagram showing an analysis result related to distribution of tensile stress generated in the tooth-root portion of the ring gear at a center in a circumferential direction of the ring gear.

It is preferable to set the width of the outside clearance portion 38 in the central axis direction of the ring gear 14 in correspondence with the portion (a darkest portion in FIG. 17) in which maximum stress is generated in the stress distribution of the tensile stress δ shown in FIG. 17. Accordingly, the tensile stress acting on the tooth-root portions 17 of the ring gear 14 can be effectively reduced.

According to Example 3, as mentioned above, the inner peripheral surface of the ring gear 14 is provided with the outside clearance portion 38. When the press-fit surface 18 of the ring gear 14 is press-fitted on the press-fit surface 20 of the flange 12, therefore, a portion of the ring gear 14 near the first end face 30 (near the stopper 28) is not press/fitted on the flange 12. This can surely reduce the tensile stress δ generated in the tooth-root portions 17 of the ring gear 14 in the vicinity of the first end face 30 (near the stopper 28). Thus, the durability of the ring gear 14 can be surely enhanced.

Example 4

Figure 10:
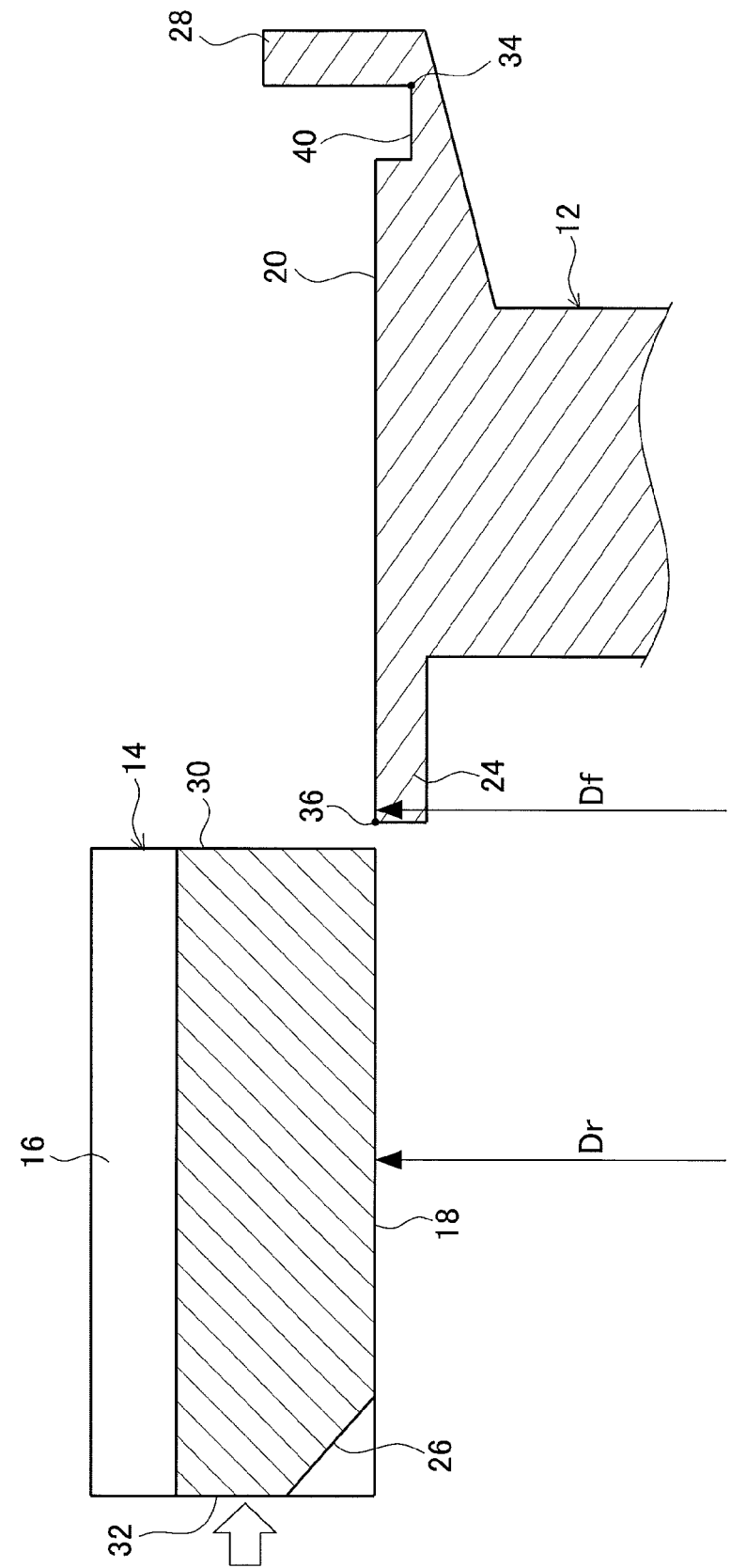
FIG. 10 is a view showing an example in which a flange of a differential case is formed with an inside clearance portion in Example 4.

Example 4 will be explained below. In the following explanation, similar or identical components to those in Examples 1 to 3 are given the same reference signs and their details are not repeated. The following explanation is made with a focus on differences from Examples 1 to 3. In Example 4, a tensile stress reducing mechanism includes an inside clearance portion 40 formed in the outer peripheral surface of the flange 12 of the differential case 10, as shown in FIG. 10. The inside clearance portion 40 is formed in the outer peripheral surface of the flange 12 and between the press-fit surface 20 and the stopper 28 in the central axis direction of the flange 12.

Figure 11:
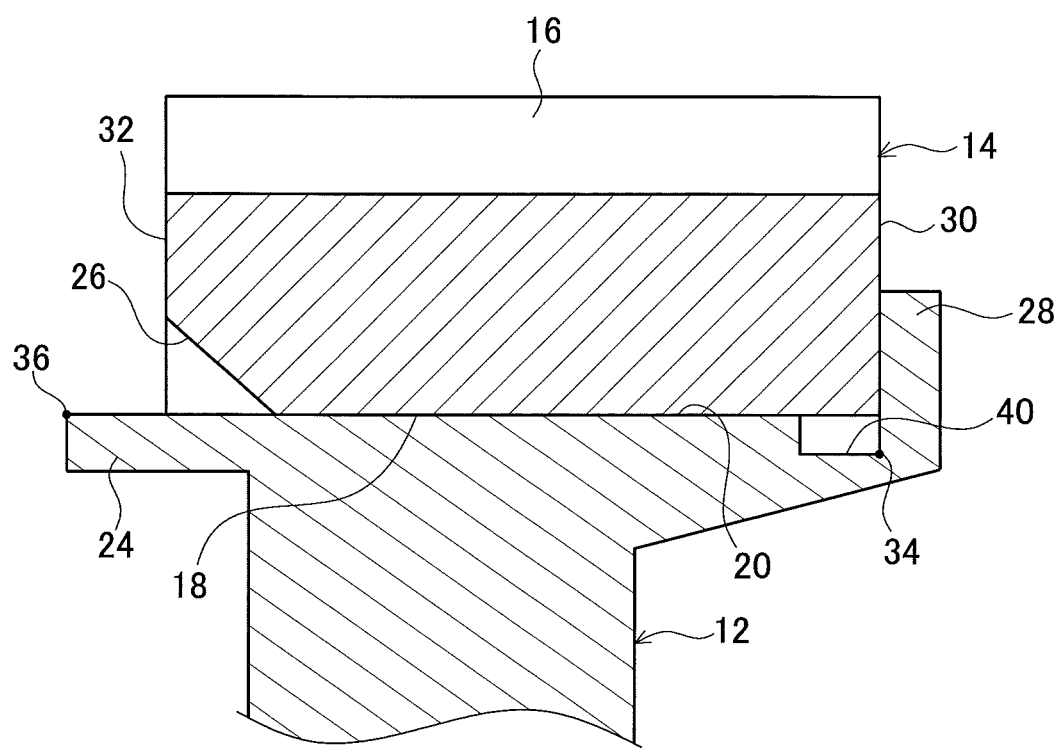
FIG. 11 is a view showing that the ring gear is press-fitted on the flange of the differential case in Example 4.

The inside clearance portion 40 is formed with the outer diameter smaller than the inner diameter Df of the press-fit surface 20 which is a press-fit portion with respect to the press-fit surface 18 of the ring gear 14. In this way, the inside clearance portion 40 is formed to be recessed more inward in the radial direction of the flange 12 than the press-fit surface 20. Further, the inner diameter Dr of the press-fit surface 18 of the ring gear 14 is set to be constant in the central axis direction of the ring gear 14. Accordingly, as shown in FIG. 11, when the press-fit surface 18 of the ring gear 14 is press-fitted on the press-fit surface 20 of the flange 12, a part of the flange 12 formed with the inside clearance portion 40 is not press-fitted with the press-fit surface 18 of the ring gear 14. Specifically, the press-fit allowance between the inner peripheral surface of the ring gear 14 in the position of the first end face 30 of the ring gear 14 and the outer peripheral surface of the flange 12 is zero, so that this press-fit allowance is smaller than the press-fit allowance between the inner peripheral surface of the ring gear 14 in the position of the second end face 32 of the ring gear 14 and the outer peripheral surface of the flange 12.

It is preferable to set the width of the inside clearance portion 40 in the central axis direction of the flange 12 in correspondence with the portion (a darkest portion in FIG. 17) in which maximum stress is generated in the stress distribution of the tensile stress δ shown in FIG. 17. Accordingly, the tensile stress acting on the tooth-root portions 17 of the ring gear 14 can be effectively reduced.

According to Example 4, as mentioned above, the outer peripheral surface of the flange 12 is provided with the inside clearance portion 40. When the press-fit surface 18 of the ring gear 14 is press-fitted on the press-fit surface 20 of the flange 12, therefore, a portion of the ring gear 14 near the first end face 30 (near the stopper 28) is not press-fitted on the flange 12. This can surely reduce the tensile stress δ generated in the tooth-root portions 17 of the ring gear 14 in the vicinity of the first end face 30 (near the stopper 28) of Thus, the durability of the ring gear 14 can be surely enhanced.

Example 5

Figure 12:
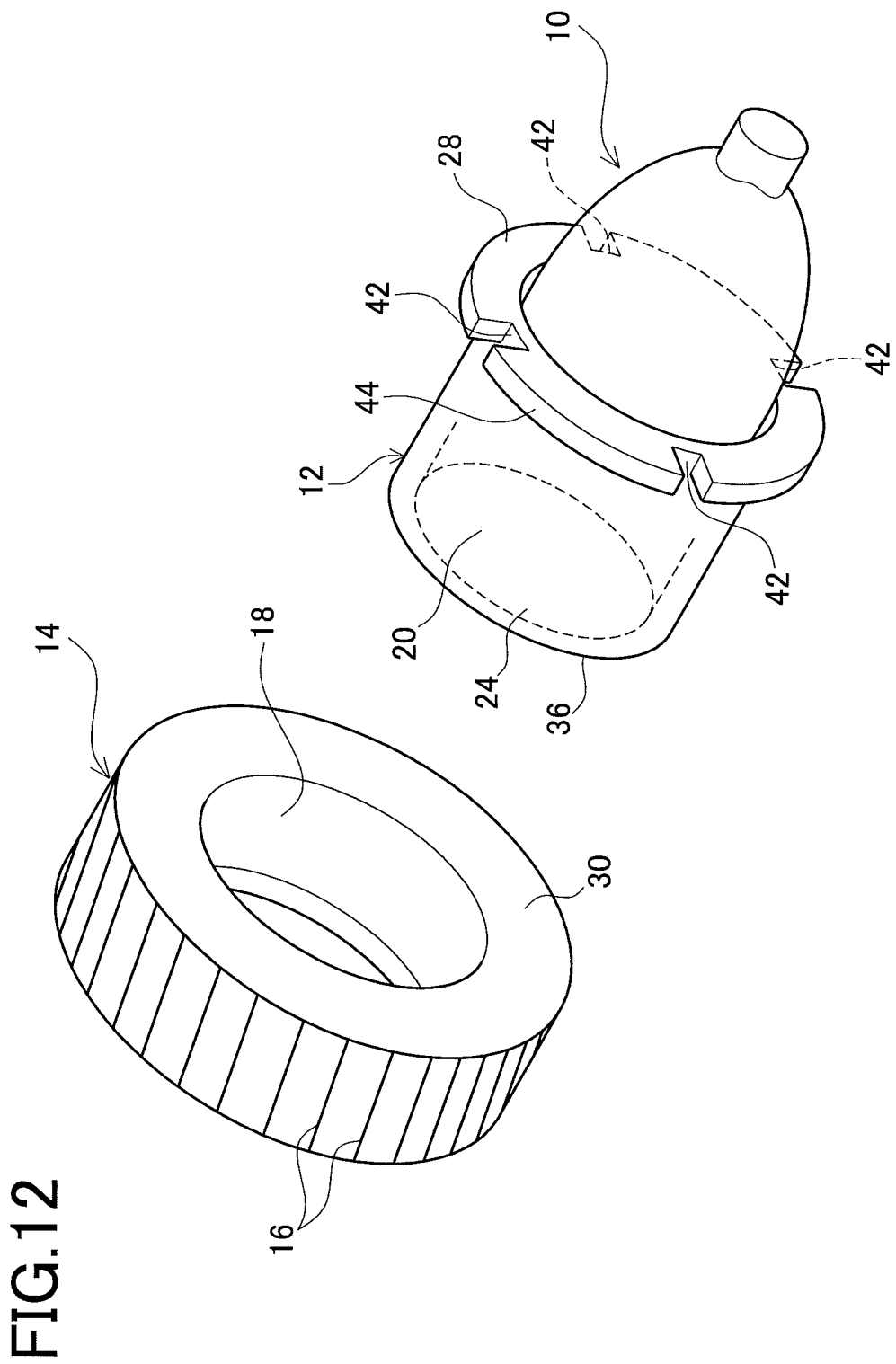
FIG. 12 is a view showing an example in which a stopper is formed with cutouts in Example 5.

Example 5 will be explained below. In the following explanation, similar or identical components to those in Examples 1 to 4 are given the same reference signs and their details are not repeated. The following explanation is made with a focus on differences from Examples 1 to 4. In Example 5, a tensile stress reducing mechanism includes cutouts 42 formed in the stopper 28 of the flange 12 of the differential case 10 as shown in FIG. 12. Each of the cutouts 42 is formed to be recessed inward from the outer peripheral surface 44 of the stopper 28 in the radial direction of the flange 12. In an example shown in FIG. 12, a total of four cutouts 42 are formed. The outer diameter of the press-fit surface 20 of the flange 12 is constant in the central axis direction of the flange 12. The inner diameter of the press-fit surface 18 of the ring gear 14 is constant in the central axis direction of the ring gear 14.

Although the number of cutouts 42 is not limited particularly, it is preferable to provide two or more (i.e., a plurality of) cutouts 42 so that they are arranged at equal intervals in the circumferential direction of the flange 12. This arrangement achieves good balance in weight in the circumferential direction of the differential case 10, leading to stable power transmission in a vehicle.

Figure 13:
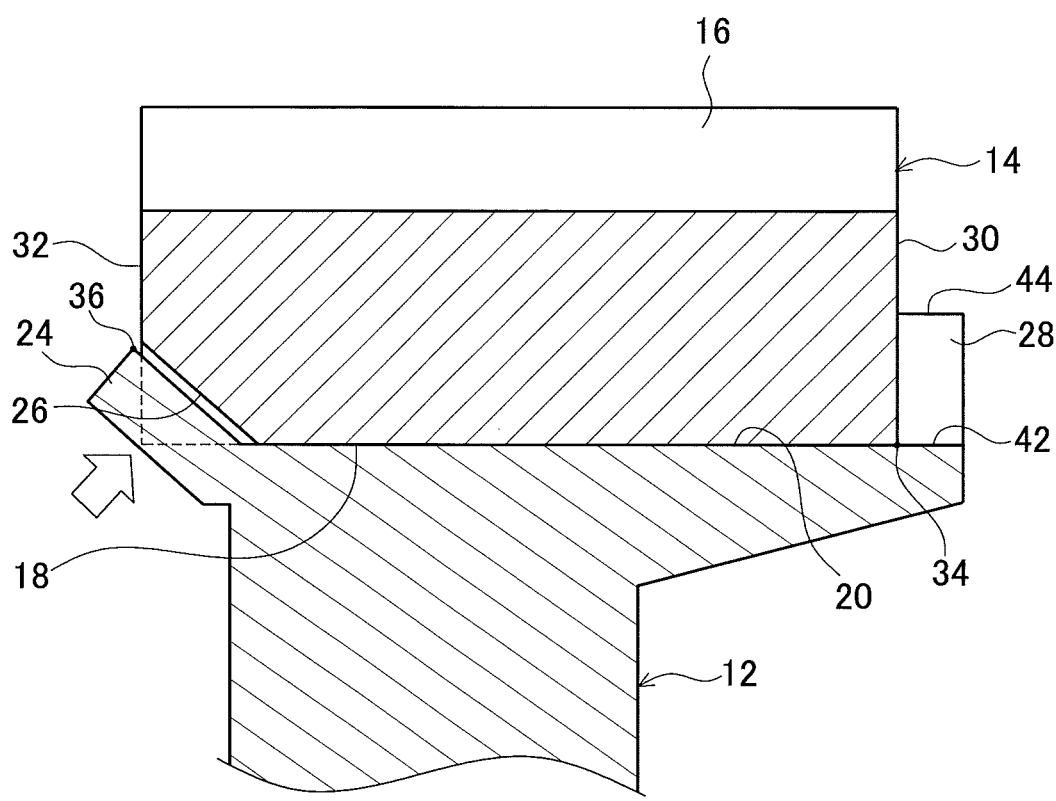
FIG. 13 is a view showing a fastening state of a ring gear and a flange of a differential case in Example 5.

According to Example 5, as above, the stopper 28 is provided with the cutouts 42, so that the rigidity of the stopper 28 in the radial direction can be reduced. Therefore, the tensile stress δ generated in the tooth-root portions 17 of the ring gear 14 in the vicinity of the first end face 30 (near the stopper 28) can be surely reduced. Since the press-fit surface 18 of the ring gear 14 is press-fitted onto the press-fit surface 20 of the flange 12 and then the caulking portion 24 is caulked in the notches 26 as shown in FIG. 13, thereby fastening the ring gear 14 to the flange 12, the tensile stress δ remaining in the tooth-root portions 17 can be reliably reduced. Thus, the durability of the ring gear 14 can be surely enhanced.

Example 6

Figure 14:
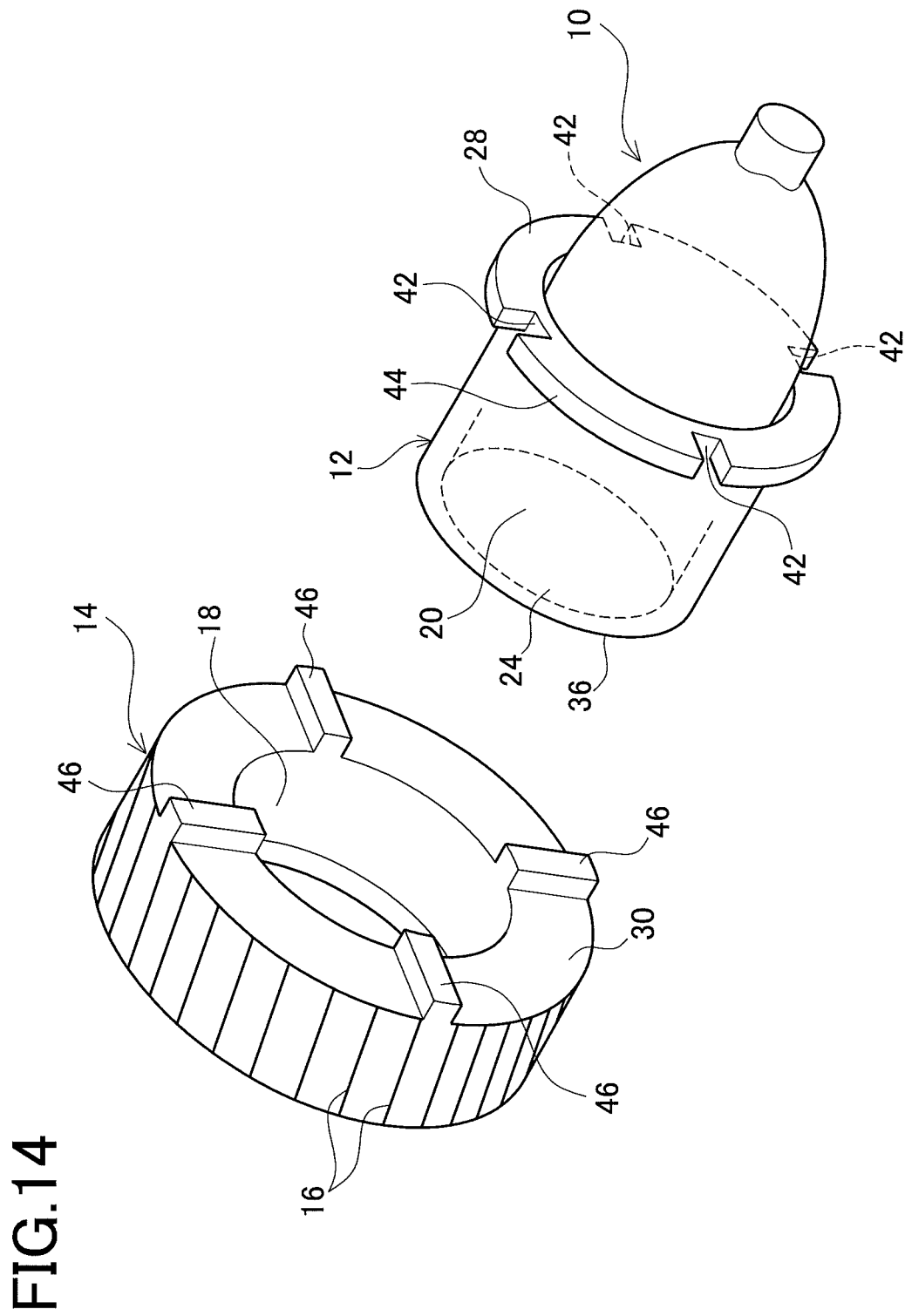
FIG. 14 is a view showing an example in which a stopper is formed with cutouts and a ring gear is formed with ribs in Example 6.

Example 6 will be explained below. In the following explanation, similar or identical components to those in Examples 1 to 5 are given the same reference signs and their details are not repeated. The following explanation is made with a focus on differences from Examples 1 to 5. In Example 6, as in Example 5, a tensile stress reducing mechanism includes the cutouts 42 formed in the stopper 28 of the flange 12 of the differential case 10 as shown in FIG. 14.

Figure 15:
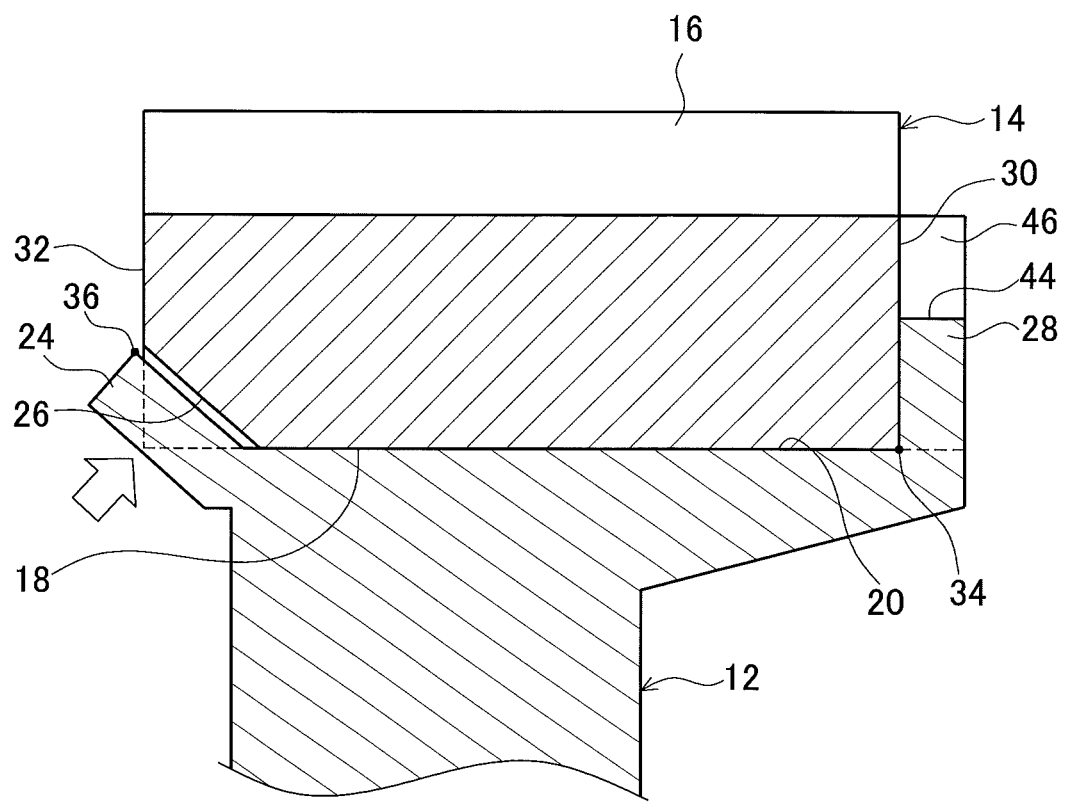
FIG. 15 is a view showing a fastening state of the ring gear and a flange of a differential case in Example 6.
Figure 16:
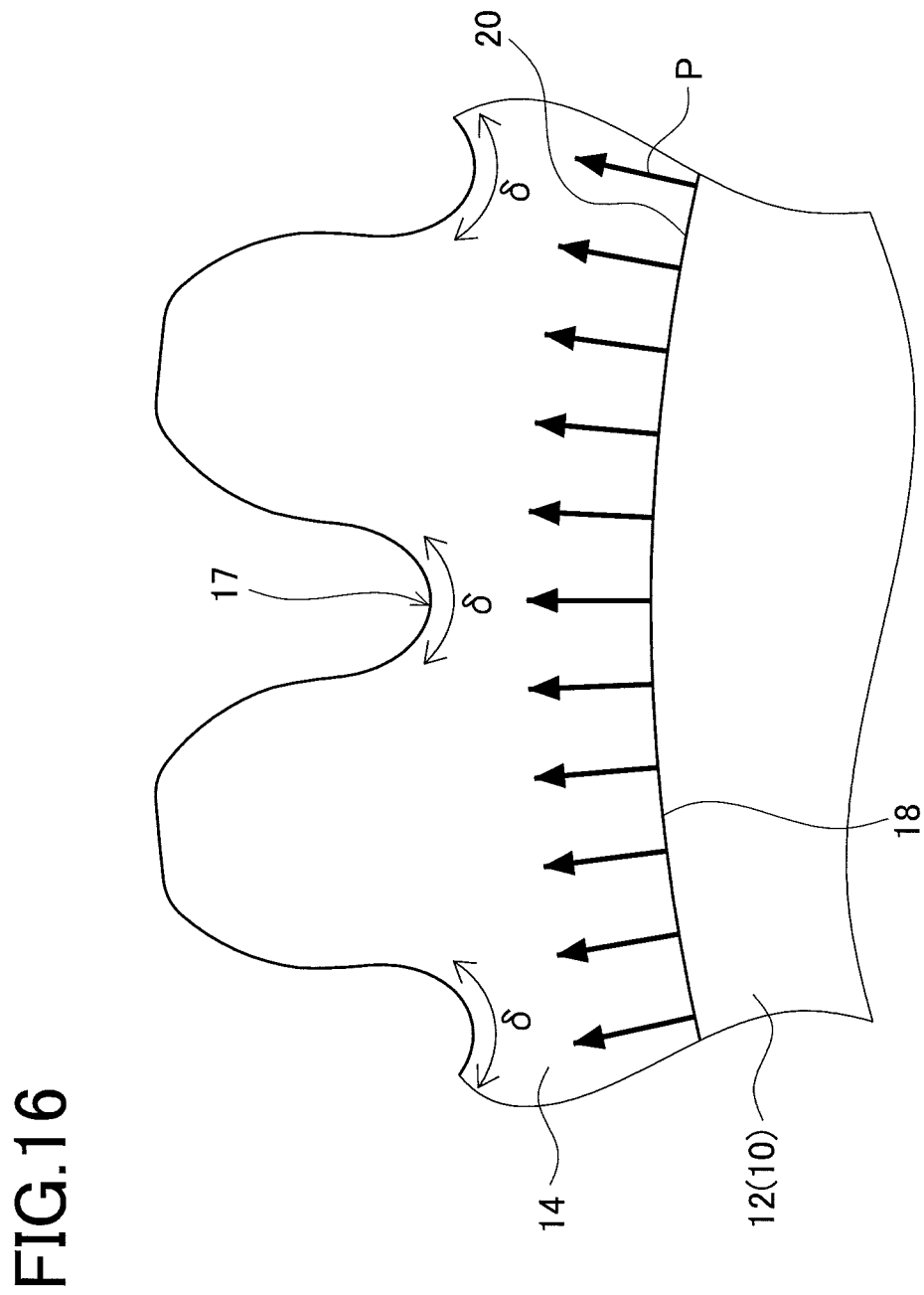
FIG. 16 is an enlarged schematic view showing a press-fit surface of a ring gear and its surroundings when the ring gear is press-fitted on the differential case.

Furthermore, ribs 46 are formed on the first end face 30 of the ring gear 14 so that the ribs 46 are arranged in the same phase position to the cutouts 42 in the circumferential direction of the ring gear 14. As shown in FIG. 14, each rib 46 has a shape protruding from the first end face 30 of the ring gear 14 in the central axis direction of the ring gear 14. As shown in FIG. 15, the ring gear 14 is press-fitted on the flange 12 so that the first end face 30 of the ring gear 14 comes into contact with the stopper 28 and also the ribs 46 engage in the cutouts 42.

According to Example 6, the cutouts 42 formed in the stopper 28 engage with the ribs 46 formed in the ring gear 14. Thus, the cutouts 42 and the ribs 46 are portions contributing to transmission of torque in the differential sub-assembly 1. Accordingly, in the differential sub-assembly 1 produced in such a manner that the press-fit surface 18 of the ring gear 14 is press-fitted onto the press-fit surface 20 of the flange 12 and then the ring gear 14 is fastened to the flange 12 as shown in FIG. 15, the fastening portions of the ring gear 14 and the flange 12 can provide increased strength.

Modified Example

Examples 1 to 6 described above show the cases of fastening the caulking portion 24 and the notches 26 by caulking. The present invention is not limited to the above examples and may be applied to an example where the flange of the differential case 10 is fastened to the ring gear 14 by welding.

The above examples are mere example and do not impart any limitations to the present invention. The present invention may be embodied in other specific forms without departing from the essential characteristics thereof.

REFERENCE SIGNS LIST

1 Differential sub-assembly
10 Differential case
12 Flange
14 Ring gear
16 Teeth 17 Tooth-root portion
18 Press-fit surface
20 Press-fit surface
22 Inner peripheral edge portion
24 Caulking portion
26 Notch
28 Stopper
30 First end face
32 Second end face
34 First end
36 Second end
38 Outside clearance portion
40 Inside clearance portion
42 Cutout
44 Outer peripheral surface
46 Protrusion

The invention claimed is:

1. A press-fit structure in which one of end faces of a gear in a central axis direction is placed in contact with a protrusion formed to protrude outward from an outer peripheral surface of an annular component in a radial direction of the annular component, and an inner peripheral surface of the gear is press-fitted on the outer peripheral surface of the annular component,
wherein the press-fit structure includes a tensile stress reducing mechanism to reduce tensile stress in a position of at least the one end face of the gear, the tensile stress being generated in a tooth-root portion of the gear when the inner peripheral surface of the gear is press-fitted on the outer peripheral surface of the annular component,
wherein the tensile stress reducing mechanism is configured so that a press-fit allowance between the inner peripheral surface of the gear and the outer peripheral surface of the annular component and in the position of the one end face of the gear is set smaller than a press-fit allowance between the inner peripheral surface of the gear and the outer peripheral surface of the annular component and in a position of the other end face of the gear in the central axis direction, and
wherein the inner diameter of the gear in the position of the one end face and the inner diameter in the position of the other end face are set at a ratio equal to a ratio of a tensile stress generated in the position of the one end face and a tensile stress generated in the position of the other end face in a case wherein the inner diameter of the gear is constant.

2. The press-fit structure according to claim 1, wherein the inner peripheral surface of the gear is formed with an inner diameter which becomes gradually larger in the central axis direction of the one end face of the gear.

3. The press-fit structure according to claim 1, wherein the outer peripheral surface of the annular component is formed with an outer diameter which becomes gradually smaller in the central axis direction of the protrusion of the annular component.

4. The press-fit structure according to claim 1, wherein the inner peripheral surface of the gear includes a press-fit portion with respect to the outer peripheral surface of the annular component and an outside clearance portion between the one end face and the press-fit portion, the outside clearance portion being recessed more outward than the press-fit portion in a radial direction of the gear.

5. The press-fit structure according to claim 1, wherein the outer peripheral surface of the annular component includes a press-fit portion with respect to the inner peripheral surface of the gear and an inside clearance portion formed between the protrusion and the press-fit portion, the inside clearance portion being recessed more inward than the press-fit portion in a radial direction of the annular component.

6. The press-fit structure according to claim 1, wherein the gear is a ring gear of a differential device, and
the annular component is a flange provided in a differential case of the differential device.

7. A press-fit method including press-fitting an inner peripheral surface of a gear onto an outer peripheral surface of an annular component, and bringing one of end faces of the gear in a central axis direction into contact with a protrusion protruding outward from the outer peripheral surface of the annular component in a radial direction of the annular component,
wherein the method further includes reducing tensile stress in a position of at least the one end face of the gear, the tensile stress being generated in a tooth-root portion of the gear when the inner peripheral surface of the gear is press-fitted onto the outer peripheral surface of the annular component,
wherein a press-fit allowance between the inner peripheral surface of the gear and the outer peripheral surface of the annular component and in the position of the one end face of the gear is set smaller than a press-fit allowance between the inner peripheral surface of the gear and the outer peripheral surface of the annular component and in a position of the other end face of the gear in the central axis direction, and
wherein the inner diameter of the gear in the position of the one end face and the inner diameter in the position of the other end face are set at a ratio equal to a ratio of a tensile stress generated in the position of the one end face and a tensile stress generated in the position of the other end face in a case wherein the inner diameter of the gear is constant.

8. The press-fit method according to claim 7, wherein the inner peripheral surface of the gear is formed with an inner diameter which becomes gradually larger in the central axis direction of the one end face of the gear.

9. The press-fit method according to claim 7, wherein the outer peripheral surface of the annular component is formed with an outer diameter which becomes gradually smaller as being closer to the protrusion in the central axis direction of the protrusion of the annular component.

10. The press-fit method according to claim 7, wherein the inner peripheral surface of the gear includes a press-fit portion with respect to the outer peripheral surface of the annular component and an outside clearance portion between the one end face and the press-fit portion, the outside clearance portion being recessed more outward than the press-fit portion in a radial direction of the gear.

11. The press-fit method according to claim 7, wherein the outer peripheral surface of the annular component includes a press-fit portion with respect to the inner peripheral surface of the gear and an inside clearance portion formed between the protrusion and the press-fit portion, the inside clearance portion being recessed more inward than the press-fit portion in a radial direction of the annular component.

12. The press-fit method according to claim 7, wherein the gear is a ring gear of a differential device, and
the annular component is a flange provided in a differential case of the differential device.

* * * * *